United States Patent

Korogi et al.

[11] Patent Number: 6,101,165
[45] Date of Patent: Aug. 8, 2000

[54] TRACKINGLESS HIGH-SPEED OPTICAL READOUT METHOD BY PLANAR APERTURED PROBE ARRAY

[75] Inventors: Motonobu Korogi; Kazuo Tsutsui, both of Yokohama; Motoichi Otsu, Tokyo, all of Japan

[73] Assignee: Tokyo Institute of Technology, Tokyo, Japan

[21] Appl. No.: 09/109,907

[22] Filed: Jul. 2, 1998

[30] Foreign Application Priority Data

Dec. 26, 1997 [JP] Japan ................................ 9-359428

[51] Int. Cl.$^7$ .................................................. G11B 7/00
[52] U.S. Cl. .................................................. 369/126
[58] Field of Search .................................. 369/126, 112, 369/100, 58, 59, 13, 44.37; 250/216, 305, 306, 310

[56] References Cited

U.S. PATENT DOCUMENTS 5,754,514  5/1998  Guerra ..................................... 369/126

FOREIGN PATENT DOCUMENTS 6-331805  12/1994  Japan .
8-321070  12/1996  Japan .

*Primary Examiner*—Thang V. Tran
*Attorney, Agent, or Firm*—Venable

[57] ABSTRACT

A recording surface of a disk-shaped record medium is scanned by respective proves of a planar apertured probe array including a plurality of apertured probes arranged in a two-dimensional manner such that the recording surface of the record medium is scanned along a plurality of parallel scanning tracks whose pitch is smaller than a half of a data track pitch. Evanescent light generated by respective probes is interacted with the recording surface to produce scattered light whose intensity is modulated in accordance with the recorded data. The scattered light is received by a plurality of light receiving elements to generate electric signals, and these electric signals are once stored in a storage device. These electric signals are processed to select valid data, and desired data is extracted from the valid data.

7 Claims, 3 Drawing Sheets

O: Probe Position

TRACKINGLESS HIGH-SPEED OPTICAL READOUT METHOD BY PLANAR APERTURED PROBE ARRAY

BACKGROUND OF THE INVENTION

1. Field of the Invention

This invention relates to a method of optically reading data out of a record medium and, more particular, to a method of optically reading data recorded along concentric or spiral equidistant data tracks on a disk-shaped record medium, by means of a planar apertured probe array at a high speed without tracking control.

2. Related Art Statement

There has been proposed a method of optically reading data out of a record medium by means of a near-field optical probe which is arranged in a very close vicinity of the record medium. In this method, evanescent light generated from the probe is interacted with a recording surface of the record medium to generate scattered light. An intensity of the scattered light is modulated in accordance with a crenellated structure of a recording surface of the record medium. Therefore, by detecting a change in an intensity of the scattered light, the date can be reproduced. It has been probed that such a near-field optical reproducing method can realize ultra high density recording of an order of 1 Tbit/inch.

In the known method, the probe provided in a recording and/or reproducing head is formed by an optical fiber having a sharp core tip. In the known method, high speed sweeping or scanning is impossible, because the tip of the probe is fragile mechanically and the throughput of the light is low. In addition, it is difficult to perform a tracking control for the data tracks having a very small width of several ten-nm width.

SUMMARY OF THE INVENTION

It is an object of the invention to provide a novel and useful method of optically reading data out of a record medium at a high speed without tracking control.

According to the invention, a method of reproducing optically data recorded along concentric or spiral equidistant data tracks on a disk-shaped record medium comprises the steps of:

scanning a recording surface of said record medium with light produced by a probe array having plural probes arranged in a two-dimensional manner such that the probes scan optically the recording surface of the record medium along scanning tracks to generate light whose intensity is modulated in accordance with the data recorded on the record medium, successive scanning tracks being separated from each other by a same distance which is not larger than a half of a pitch of the data tracks;

detecting a change in light caused by the respective probes to derive electric signals;

storing said electric signals in a storage device as a signal on a time domain;

processing said electric signal to select valid data; and extracting desired data from the valid data.

In a preferable embodiment of the optical readout method according to the invention, said step of processing the electric signals to select the valid data includes a step of detecting one or more probes which have correctly scanned the data track on the record medium and a step of selecting one or more electric signals produced by the said one or more probes. In this case, the selection of the valid data may be performed by utilizing at least one of addition of error code, addition of special code and detection of characteristics of waveforms of the electric signals.

In another preferable embodiment of the method according to the invention, a position of said probe array relative to the recording surface of the record medium is controlled in accordance with information representing a relationship between the recorded on the record medium and addresses of the data.

According to the invention, said scanning step may be preferably conducted by using a planar apertured probe array which comprises plural apertured probes arranged in a two-dimensional manner, each of said apertured probes generating evanescent light which is to be interacted with the recording surface of the record medium to produce scattered light whose intensity is modulated in accordance with the recorded data, and said step of detecting the light is performed by photo-electrically converting the scattered light. In this case, said apertured probes of the planar apertured probe array may be arranged such that a pitch of successive scanning tracks on the recording medium is equal to or smaller than a half of the data track pitch.

Furthermore, according to the invention, said valid data may be detected by processing a first set of electric signals produced by odd- numbered apertured probe and a second set of electric signals produced by even-numbered apertured independently from each other, and one of said first and second sets of electric signals are selected as valid signals from which the valid data can be derived.

DESCRIPTION OF THE PREFERRED EMBODIMENT

Figure 1:
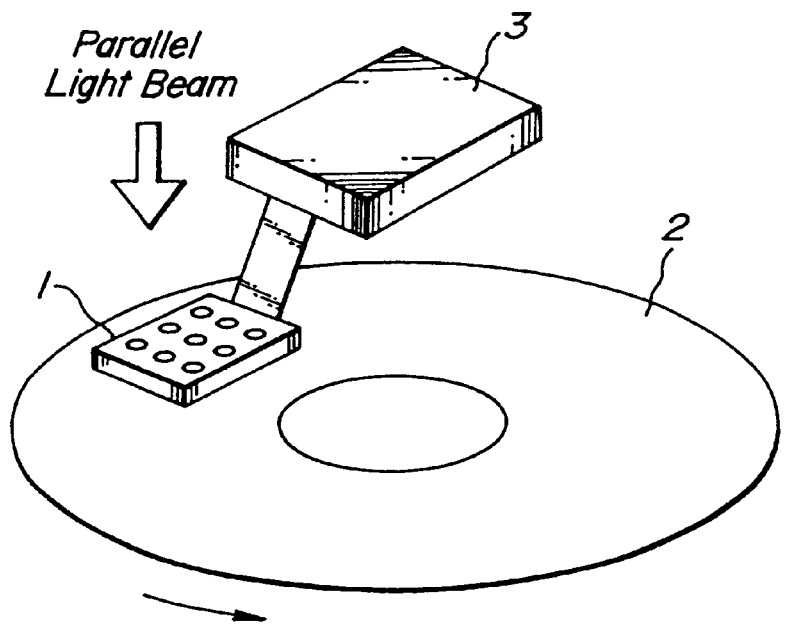
FIG. 1 is a perspective view showing diagrammatically an embodiment of an optical recording and reproducing device having a planar apertured probe array for performing the method according to the invention.

FIG. 1 is a schematic view showing an embodiment of an optical recording and reproducing device for performing the optical readout method according to the invention. The present device is of the near-field optical reproduction, and includes a planar apertured probe array 1. A record medium 2 may be formed by, for example, a transparent disk-shaped flat substrate. A lubricant liquid is provided between a lower surface of the planar apertured probe array 1 and an upper surface of the record medium 2, and the planar apertured probe array 1 is brought into a close vicinity of the record medium 2 by a distance of about 100 nm or less. The planar apertured probe array 1 is coupled with a mechanical driving device 3 so as to control a movement of the planar apertured probe array 1 in a direction perpendicular to a tangential direction of the rotation of the record medium 2, i.e. a radial direction of the disk-shaped record medium. The mechanical driving device 3 also control a contact pressure between the planar apertured probe array 1 and the record medium 2.

Figure 3:
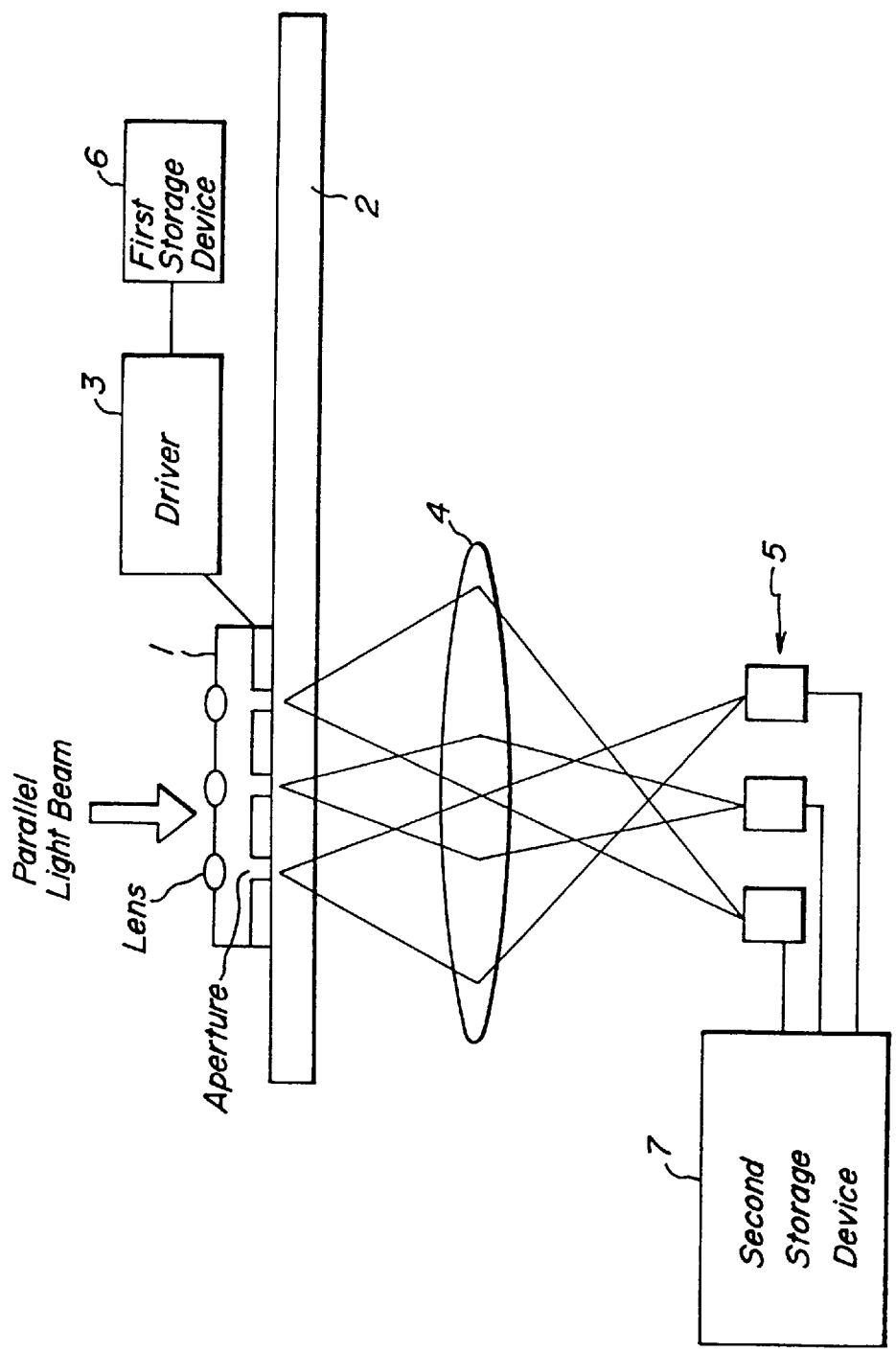
FIG. 3 is a schematic view depicting diagrammatically the optical recording and reproducing device shown in FIG. 1.

The planar apertured probe array 1 comprises a plurality of planar apertured probes arranged two-dimensional manner. As shown in FIG. 3, the planar aperture probe 1 may comprise a transparent substrate, a metal film deposited on one side of the substrate and having optical micro apertures formed at given locations, and micro lenses provided above the apertures on the other surface of the substrate. The micro lens serves to focus light onto an aperture so that a mode within the apertures can be excited highly efficiently. A thickness of the substrate of the probes is sufficiently small and the substrate can be bent to a limited extent such that undesired deflection of the record medium 2 can be absorbed. In this case, the planar apertured probe array 1 can be bent or deflected according to the deflection of the record medium 2 by a surface tension of the lubricant liquid. Then, distances between each probes of the planar apertured probe array 1 and the recording surface of the record medium can be made smaller than a case in which a rigid planar apertured probe array is employed.

Figure 2:
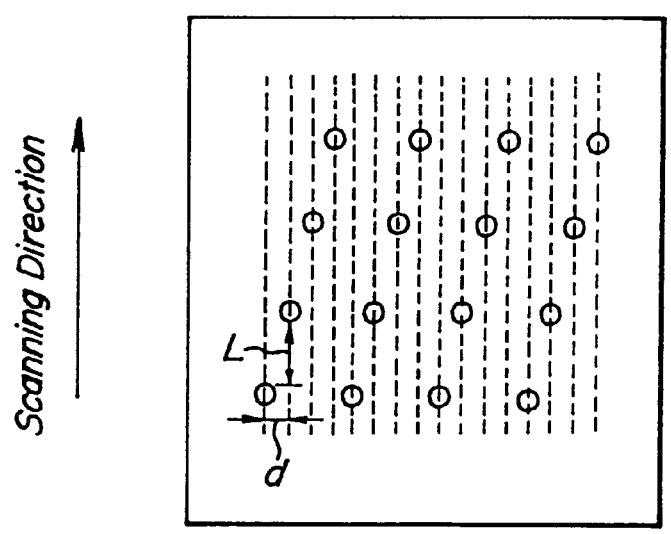
FIG. 2 is a schematic plan view illustrating diagrammatically scanning tracks of the probes.

FIG. 2 shows diagrammatically scanning tracks along which respective probes of the planar apertured probe array 1 trace during the operation. The probes are distributed on a two-dimensional plane on the planar apertured probe array 1 and are arranged such that each of the probes can trace different scanning tracks on the record medium 2 upon the rotation of the record medium, a distance between adjacent scanning tracks viewed in the direction perpendicular to the scanning direction being smaller than a distance L between adjacent probes. Therefore, each of the probes can sweep or scan the record medium at an interval d smaller than the probe interval L. That is to say, when the record medium 2 is rotated relative to the planar apertured probe array 1, relative positions of the probes with respect to the record medium change in a direction shown by an arrow in the FIG. 2, and each probes pass along respective broken lines which extent in parallel with each other with the interval d.

FIG. 3 is a schematic view illustrating the detailed structure of the planar apertured probe array 1 used in the method according to the invention. When a parallel light beam is made incident upon the planar apertured probe array 1, light is focused by the micro lenses onto the apertures so that near-field light or evanescent light having a size substantially equal to a diameter of the aperture is generated at respective apertures. The near field light emanating from each of the probes is interacted with the recording surface of the record medium 2 to produce scattered light. The scattered light produced by respective apertured probes is focused on respective light receiving elements of a light receiving element array 5 by a lens system 4. An intensity of the scattered light is modulated in accordance with the data recorded on the record medium 2. The light receiving elements of the array 5 produce electric signals representing an intensity of the scattered light. Therefore, the data recorded on the record medium can be reproduced from a distribution of the thus detected intensity of the scattered light, because the intensity of the scattered light from the portion on which is recorded the data is different from that from other portions.

According to the invention, the substrate of planar apertured probe array 1 is preferably formed by a silicon substrate. Then, apertures each having a pyramid frustum may be formed by anisotropic etching, and micro lenses may be formed by small glass balls inserted in the apertures. Furthermore, in this case, the light receiving element array may be formed in the silicon substrate. In such a case, the lens system 4 shown in FIG. 2 is no more necessary.

According to the invention, the scanning track interval d of successive probes is set to be equal to or smaller than a half of the recording track pitch p. When the recording track pitch may be considered to be equal to a track width s, the scanning interval d is set to be equal to or smaller than the track width. When a diameter of an aperture of the probe is smaller than 2d and the resolution on the spatial frequency of the probes exceeds ½ d, all the data included in a surface area of the record medium scanned by the planar apertured probe array 1 can be reproduced from the measurement of the scattered light intensity according to the sampling theorem.

In order to readout desired data recorded on the record medium, it is necessary to identify a position of the relevant data on the recording surface of the record medium. To this end, information representing a relation between an address and a position of the data on the recording area of the record medium is stored in a first storage device 6 such as memory and hard disk driver connected to the mechanical driving device 3 of the optical recording and reproducing device. On the basis of this information, the rotation of the record medium 2 and the mechanical driving device 3 are controlled such that a surface area including the desired data on the record medium can be scanned by the planar apertured probe array 1. In this case, a relative position of the planar apertured probe array 1 with respect to the record medium can be defined very accurately with a precision which is sufficiently smaller than a surface area of the planar apertured probe array 1 by controlling a rotation angle of the record medium 3 and the movement of the planar apertured probe array 1 in the radial direction of the disk-shaped record medium 2. Output electric signals supplied from respective light receiving elements of the light receiving element array 5 are stored temporarily in a second storage device 7 such as memory and hard disk driver. In this manner, a change on a time domain in a distribution of the scattered light can be attained.

As mentioned above, according to the sampling theorem, all the data included in the scanned recording surface area of the record medium can be reproduced from the thus obtained distribution of the scattered light intensity. Therefore, the desired data included in the reproduced data can be obtained.

Figure 4:
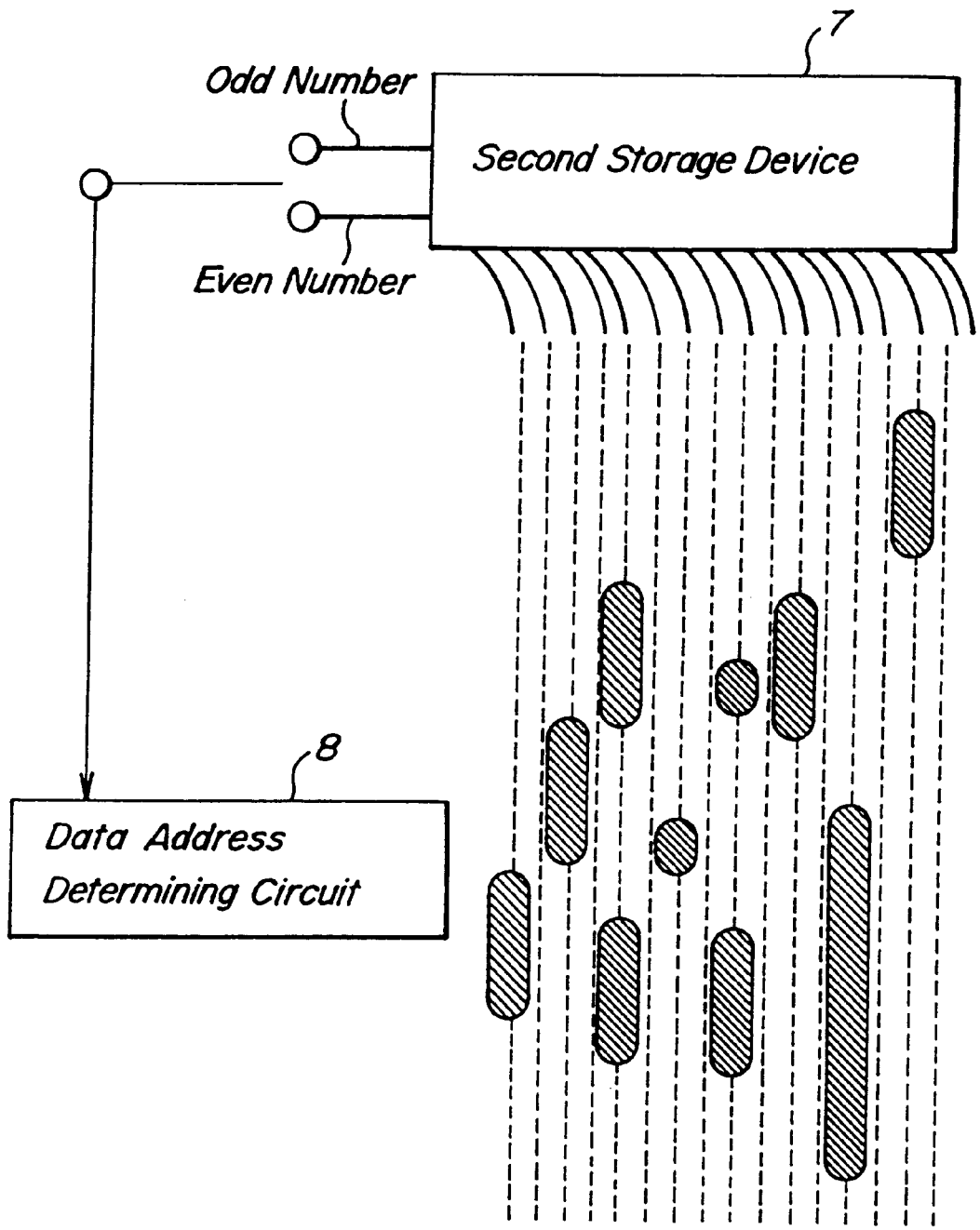
FIG. 4 shows diagrammatically a data processing in the optical recording and reproducing device.

Now a method of reading out desired data will be described by way of example with reference to FIG. 4. FIG. 4 shows diagrammatically a data processing means in the embodiment of an optical recording and reproducing device. It is assumed that the interval d at which successive probes of the planar apertured probe array 1 scan the recording surface of the record medium is equal to a half of the data track width or data track pitch. For the sake of explanation, successive probes of the planar apertured probe array 1 are numbered corresponding to the order of scanning tracks.

Since a scanned range is very small and a variation in a distance between the probes and the recording surface of the record medium within such a small scanned range is very small, at least one of the odd numbered probes and the even numbered probes scan correctly recording tracks on the record medium. In FIG. 4, broken lines represent scanning tracks scanned by respective probes, and hatched portions represent the data pits. When the data portion is scanned, an intensity of the scattered light is changed. When the data is recorded on the record medium as a pit or depression, the scattered light is reduced upon scanning the pit. In a situation shown in FIG. 4, the odd-numbered probes scan the data tracks on the record medium.

It is necessary to determine or judge which data obtained by the odd-numbered probes or by the even-numbered probes is valid. This judgement can be performed by utilizing known methods. For example, the determination may be effected by utilizing error code, by adding special code to the data or by detecting characteristics of signal waveform. For instance, when the error code which has been inserted in the data is utilized, the above judgement can be carried out accurately and simply. In this case, when a probe does not scan a data track in a correct manner, a data stream include a number of errors which could not be corrected by the error code. It should be noted that both the odd-numbered and even-numbered probes scan data tracks. Then, both the data steams are judged to be valid, because these data streams are identical with each other.

Then, the data stream which has been judged to be valid is supplied into a data address determining circuit 8, and address information contained in the data is read out. For determining the address, the address information may be inserted in data sectors having a predetermined length. In this manner, all the data in an area of the recording surface of the record medium scanned by the probes and addresses corresponding to the data can be determined. Since the readout data is stored in the second storage device 7, the desired data may be selected optionally from the readout data in accordance with a desired address.

The present invention is not limited to the embodiment explained above, but many modifications and alternations may be conceived by those skilled in the art within the scope of the invention. For instance, in the above embodiment, the data readout method according to the invention is applied to the near-field optical reproduction, but the method according to the invention may be equally applied to any other optical data reproduction.

As explained above, the present invention can provide the trackingless high-speed optical readout method that can read out desired data without tracking control.

Moreover, when the present invention is applied to the near-field optical reproduction utilizing the evanescent light, the recording surface of the record medium having an extremely high record density can be scanned efficiently by the planar apertured probe array. Therefore, the problem arisen from the mechanical strength of the known probe can be resolved and high speed scanning can be attained.

What is claimed is:

1. A method of reproducing optically data recorded along concentric or spiral equidistant data tracks on a disk-shaped record medium comprising the steps of:

scanning a recording surface of said record medium with light produced by a probe array having plural probes arranged in a two-dimensional manner such that the probes scan optically the recording surface of the record medium along scanning tracks to generate light whose intensity is modulated in accordance with the data recorded on the record medium, successive scanning tracks being separated from each other by a same distance which is not larger than a half of a pitch of the data tracks;

detecting a change in light caused by the respective probes to derive electric signals;

storing said electric signals in a storage device as a signal on a time domain;

processing said electric signal to select valid data; and extracting desired data from the valid data.

2. A method according to claim 1, wherein said step of processing the electric signals to select the valid data includes a step of detecting one or more probes which have correctly scanned the data track on the record medium and a step of selecting one or more electric signals produced by the said one or more probes.

3. A method according to claim 2, wherein said detecting step is performed by utilizing at least one of addition of error code, addition of special code and detection of characteristics of waveforms of the electric signals.

4. A method according to claim 1, wherein a position of said probe array relative to the recording surface of the record medium is controlled in accordance with information representing a relationship between the recorded on the record medium and addresses of the data.

5. A method according to claim 1, wherein said scanning step is carried out by using a planar apertured probe array which comprises plural apertured probes arranged in a two-dimensional manner, each of said apertured probes generating evanescent light which is to be interacted with the recording surface of the record medium to produce scattered light whose intensity is modulated in accordance with the recorded data, and said step of detecting the light is performed by photo-electrically converting the scattered light.

6. A method according to claim 5, wherein said apertured probes of the planar apertured probe array are arranged such that a pitch of successive scanning tracks on the recording medium is equal to a half of the data track pitch.

7. A method according to claim 6, wherein said valid data is detected by processing a first set of electric signals produced by odd-numbered apertured probe and a second set of electric signals produced by even-numbered apertured independently from each other, and one of said first and second sets of electric signals are selected as valid signals from which the valid data can be derived.

* * * * *